United States Patent
Mese et al.

(10) Patent No.: US 11,056,923 B2
(45) Date of Patent: Jul. 6, 2021

(54) WIRELESS CHARGING RELAY AND METHOD

(71) Applicant: AVAGO TECHNOLOGIES INTERNATIONAL SALES PTE. LIMITED

(72) Inventors: Murat Mese, Rancho Palos Verdes, CA (US); John Walley, Ladera Ranch, CA (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 58 days.

(21) Appl. No.: 16/000,458

(22) Filed: Jun. 5, 2018

(65) Prior Publication Data

US 2019/0372401 A1  Dec. 5, 2019

(51) Int. Cl.
| | |
|---|---|
| *H02J 7/00* | (2006.01) |
| *H02J 50/50* | (2016.01) |
| *H02J 50/12* | (2016.01) |
| *H02J 50/20* | (2016.01) |
| *H02J 7/02* | (2016.01) |

(52) U.S. Cl.
CPC ............. *H02J 50/50* (2016.02); *H02J 7/025* (2013.01); *H02J 50/12* (2016.02); *H02J 50/20* (2016.02)

(58) Field of Classification Search
CPC ...................................... H02J 50/50
USPC ........................................ 320/108
See application file for complete search history.

(56) References Cited

U.S. PATENT DOCUMENTS

| | | | | |
|---|---|---|---|---|
| 5,514,919 A | * | 5/1996 | Walley ...................... | H05C 1/06 256/10 |
| 8,963,486 B2 | * | 2/2015 | Kirby ....................... | H02J 7/355 320/108 |
| RE46,392 E | * | 5/2017 | Jung ........................ | H02J 7/0027 |
| 2008/0197804 A1 | * | 8/2008 | Onishi ..................... | H02J 7/025 320/108 |
| 2011/0118030 A1 | * | 5/2011 | Walley ..................... | G06F 21/32 463/37 |
| 2015/0229134 A1 | * | 8/2015 | Masaoka ................. | H02J 7/025 307/104 |
| 2015/0340876 A1 | * | 11/2015 | Walley .................... | H02J 50/12 307/104 |
| 2016/0190855 A1 | * | 6/2016 | Katabi .................... | H02J 50/12 320/108 |

(Continued)

OTHER PUBLICATIONS

Har. Dongsoo, "Charging Wireless Sensor Networks with Mobile Charger and Infrastructure Pivot Cluster Heads." Mar. 17, 2017.

(Continued)

*Primary Examiner* — Yalkew Fantu
(74) *Attorney, Agent, or Firm* — Morgan, Lewis & Bockius LLP

(57) ABSTRACT

A wireless charging relay, a system, and a method are provided. The wireless charging relay includes processing circuitry. The circuitry is configured to receive power wirelessly. The received power is energy harvested from at least two different input wireless power sources. The circuitry is further configured to convert the received power to an output wireless power. The type of the output wireless power is different from the received power. The wireless charging relay transmits the output wireless power.

20 Claims, 4 Drawing Sheets

(56) References Cited

U.S. PATENT DOCUMENTS

2016/0191121 A1* 6/2016 Bell .................... H02J 7/00045
307/104

OTHER PUBLICATIONS

J. Li, X. Luan, Y. Luo, X. Zhang and J. Wu, "Source nodes power optimization in energy harvesting two-way relay networks," 16th International Conference on Advanced Communication Technology, Pyeongchang, 2014, pp. 584-588. doi: 10.1109/ICACT.2014. 6779027.
Milad Tatar Mamaghani, et al, "Secure Two-Way Transmission via Wireless-Powered Untrusted Relay and External Jammer." Mar. 1, 2018. Submitted to IEEE Transactions on Vehicular Technology (14 Pages).
He (Henry) Chen, et al, "Distributed Power Splitting for SWIPT in Relay Interference Channels using Game Theory," Aug. 14, 2014. Submitted to IEEE Trans. Wireless Commun., (14 pages).
Akashkumar Rajaram, et al. "Opportunistic-Harvesting: RF Wireless Power Transfer Scheme for Multiple Access Relays Systems." Submitted to IEEE Access (vol. 5), Aug. 2, 2017, 16084-16099 (15 Pages).

\* cited by examiner

WIRELESS CHARGING RELAY AND METHOD

BACKGROUND

The use of electronic devices continues to expand into all aspects of daily life. Wireless charging can be used to charge various electronic devices. Wireless charging is the technique of wirelessly supplying power to the electronic devices rather than using a power line. Wireless charging devices are usually connected to a power source. Therefore, limiting their availability to the proximity of power sources such as power outlets.

The foregoing "Background" description is for the purpose of generally presenting the context of the disclosure. Work of the inventor, to the extent it is described in this background section, as well as aspects of the description which may not otherwise qualify as prior art at the time of filing, are neither expressly or impliedly admitted as prior art against the present invention.

SUMMARY

According to one or more aspects of the disclosed subject matter, a wireless charging relay can include processing circuitry. The circuitry is configured to receive power wirelessly. The received power is energy harvested from at least two different input wireless power sources. The circuitry is further configured to convert the received power to an output wireless power. The type of the output wireless power is different from the received power. The wireless charging relay transmits the output wireless power.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
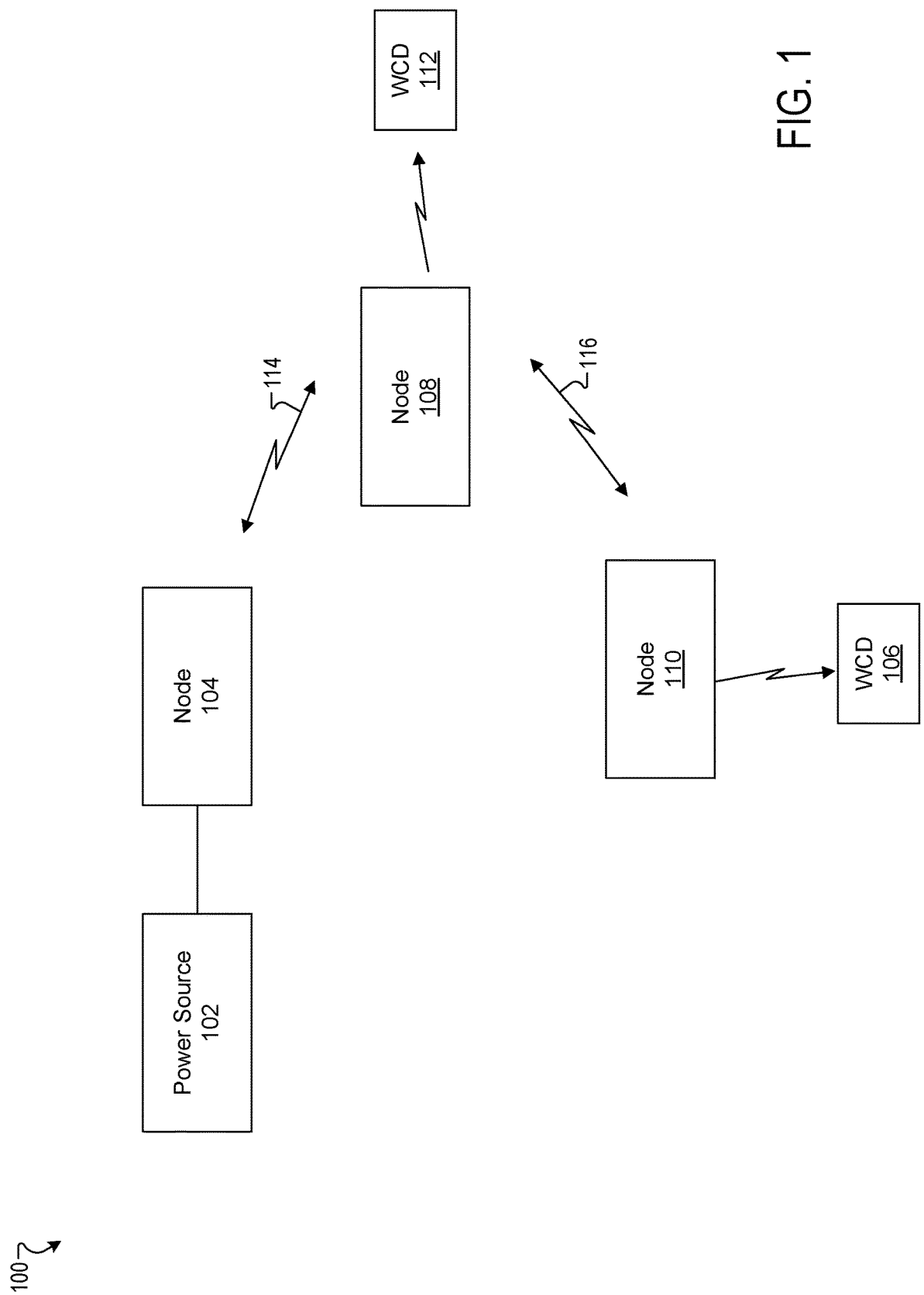
FIG. 1 is a schematic of a wireless charging system according to one example.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a program module, a script, a function, a procedure, an object method, an object implementation, in an executable application, an applet, a servlet, a source code, an object code, a shared library/ dynamic load library and/or other sequence of instructions designed for execution on a computer system.

Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Referring now to the drawings, wherein like reference numerals designate identical or corresponding parts throughout several views, the following description relates to a wireless charging relay and associated methodology for wireless charging.

Generally, a wireless charging relay can include one or more circuits to convert a received power to an output wireless power in a different form.

The wireless charging relay provides several advantages. For example, as further described herein, the relay may optimize a type of delivered power based on a plurality of factors. The wireless charging relay also provides flexibility for wireless charging capable devices to be charged wirelessly even when devices are configured to receive limited types of power. Further, a plurality of wireless charging relays may be combined to form a wireless charging system. The wireless charging system is not restrained to proximity of power sources.

FIG. 1 is a schematic of a wireless charging system 100 according to one example. The wireless charging system 100 includes a first node 104 connected to a power source 102. One or more nodes may be added between the first node 104 (i.e., power connected node and a wireless charging capable device (WCD) 106 or WCD 112. A second node 108 receives power from the first node 104 that is connected to the power source 102. Each node may be a wireless charging relay as shown and described in FIG. 2. A third node 110 may receive power from the second node 108.

The wireless charging capable device 106 may be a mobile device (such as a mobile phone, a smart phone, a laptop computer, a digital broadcasting terminal, a personal digital assistant (PDA), a portable multimedia player (PMP), or a navigation device) or an electronic device (such as a wall-mounted television (TV), a desk lamp, an electronic picture frame, a vacuum cleaner, and the like).

Nodes communicate via wireless control communication links (WCLs). The first node 104 and the second node 108 has a first wireless control communication link 114. The second node 108 receives power beamed from the first node 104. The characteristics of the beam from node 104 to node 108 can be communicated through the WCL 114. Examples of the characteristics of the beam include the width of the beam, the strength of the beam, and the like. The WCL 114 may be used to report back the channel conditions between the first node 104 and the second node 108.

In one implementation, the second node 108 has wireless charging capacity. For example, the node 108 may be used to charge the wireless charging capable device (WCD) 112. The second node 108 and the WCD 112 have wireless communication links to control wireless charging. The WCLs may have security and authentication procedures so only allowed devices at allowed times can be part of the system 100. The second node 108 may also provide power to a third node 110. The third node 110 in turn can be charging WCDs. For example, the third node 110 may provide charging power to the WCD 106.

Figure 2:
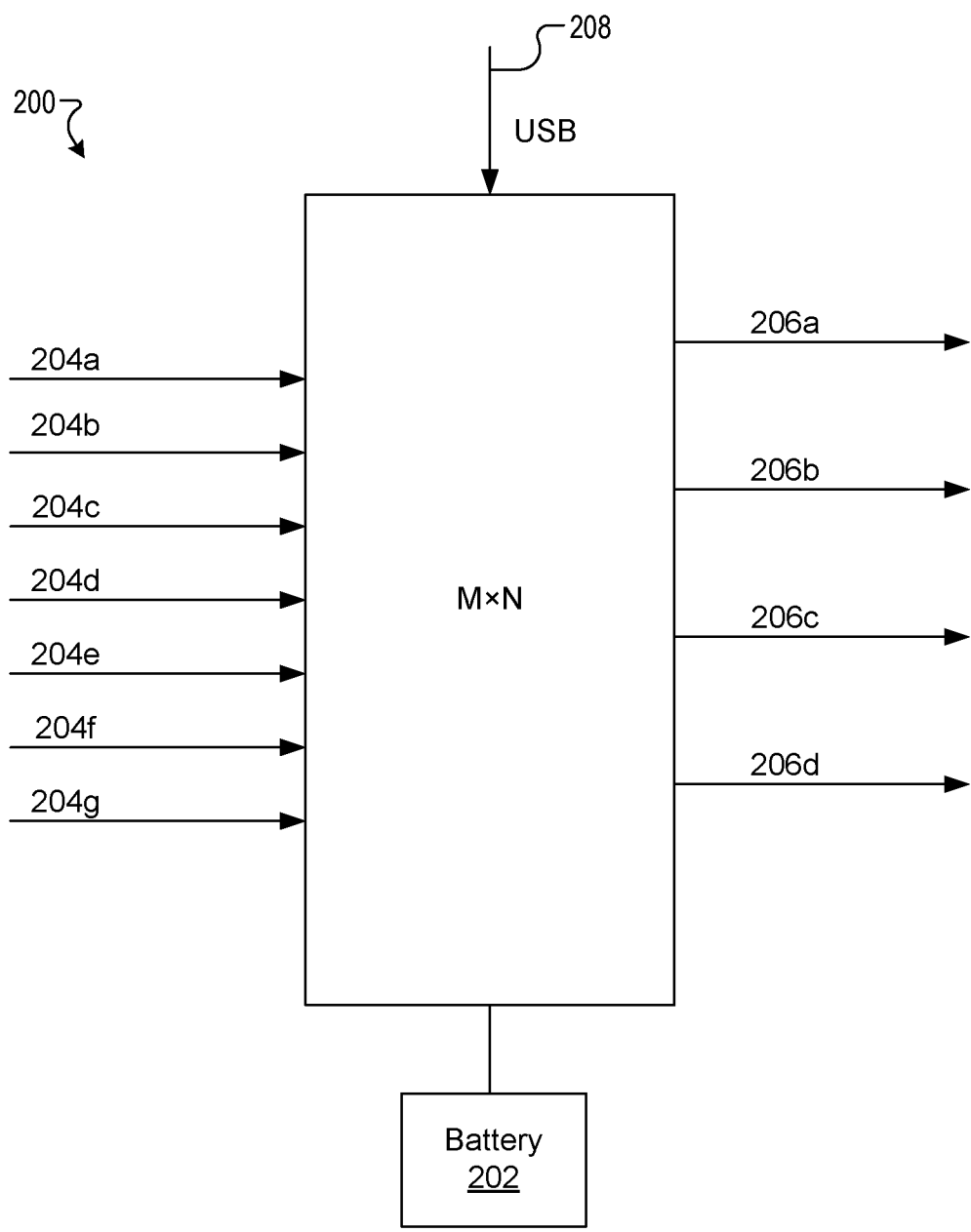
FIG. 2 is a block diagram of a wireless charging relay according to one example.

FIG. 2 is a block diagram of a wireless charging relay 200 according to one example. The relay 200 receives power in one or more forms (types) through inputs (204a, 204b, 204c, 204d, 204e, 204f, 204g) and outputs power in one or more forms via outputs (206a, 206b, 206c, 206d). The relay 200 includes one or more circuits configured to convert a first form of power to a second form of power. The one or more forms include laser, light, radio frequency (RF), induction, inductive resonance, audio, and the like as would be understood by one of ordinary skill in the art. For example, a first input 204a may be associated with laser power, a second input 204b may be associated with light or solar power, a third input 204c may be associated with RF power, a fourth input 204d may be associated with audio power, a fifth input 204e may be associated with induction power, a sixth input 204f may be associated with inductive resonant power, and a seventh input 204g may be associated with audio power. The relay 200 shares the power with capable devices such as WCDs via the outputs. The number of outputs may be equal, greater, or less than the number of inputs. For example, the relay 200 may receive power in a plurality of forms but output power in a single power type. In FIG. 2, the relay 200 receives seven different types of power via seven inputs (204a-204g) and outputs four different types of power via four outputs (206a, 206b, 206c, 206d). One or more outputs may be associated with the same type of power. For example, outputs 206a and 206b may be associated with RF power. The relay 200 may also include a Universal Serial Bus (USB) port 208. The USB port 208 may be used to receive power or to transmit power.

Microwave transmission of power includes transmitting power by emitting super-high-frequency electromagnetic waves such as microwaves via an antenna. Magnetic induction uses magnetic inductive coupling between adjacent coils. Magnetic resonance transmits non-radial magnetic field energy between two resonators.

In one implementation, the relay 200 may include a battery 202. The battery 202 may store the energy harvested over time via inputs (204a-204g). The battery 202 may be a rechargeable battery.

The relay 200 receives power in one form and converts the received power to a different form. Then, the energy is broadcasted via the outputs. For example, the power may be received via the USB port 208 and the power is sent out (i.e., broadcasted) in RF. In another example, the power is received in RF (e.g., via the third input 204c) and sent out via the USB port 208. The capable devices or target devices may use a specific power harvester based on a plurality of factors including cost, size, and use case. For example, a cost function may be associated with power received over the USB port 208 or a mini-USB connector.

In one implementation, the relay 200 selects to receive a power in a predetermined form based on a plurality of factors. For example, the relay 200 may activate selected inputs based on the time of day. The relay 200 may activate the input 204b associated with solar energy when the solar cell efficiency is the highest. In one example, the input 204b may be disabled when the relay 200 is located inside a room. The type of power outputted from the relay 200 may be based on a plurality of factors including the time and date, presence or detection of other relays and devices in the proximity of the relay 200, and the like.

In one implementation, the relay 200 may further include a communication module that support any wireless communication link such as a Bluetooth, Bluetooth LE, WiFi, ZigBee, or near field communication (NFC) mediated link. The wireless communication link may be used to activate a power transfer or to specify a type of power conversion (i.e., may specify an output type). For example, the WCD may transmit an identification of one or more types of power the WCD is capable to receive. In one implementation, the communication module may be powered using power received via inputs (204a-204g).

The relay 200 may be a passive device. The passive relay may include a surface, a tile surface, a tile on the floor, a painting on a wall, a mouse pad, and the like. The passive relay may be part of furniture, tiles, lamps, and the like. The passive relay may have no primary source (i.e., not directly coupled to a power source).

The one or more circuits may include a plurality of electronic elements that includes active elements and passive elements. For example, the circuit may include an impedance matching circuit to improve the power transmission efficiency. For example, the circuit may include a plurality of relay coils which magnetically resonate with the magnetic field. The one or more circuits may include antennas to transmit the power.

In one implementation, the relay 200 may convert a radio-frequency (RF) power signal of a first frequency to an RF power signal having a second frequency (i.e., desired frequency). In other words, the relay 200 may receive an RF power signal having the first frequency, convert the RF power signal to a signal having the second frequency, and transmit the power signal having the second frequency. The output power type may be manually controlled by a user. Additionally or alternatively, the output power type can be auto negotiated between the devices based on preset preferences and/or a plurality of factors. The plurality of factors includes elements, relays, obstacles in the environment, or the like.

In one implementation, a system of relays is formed (e.g., system 100 of FIG. 1). The system may include one or more relays 200. The relays may be identical (i.e., having the same conversion capabilities) or non-identical (i.e., each relay may have different power conversion capabilities). For example, the power is converted by two or more relays before being transmitted to a WCD when one relay is not configured to convert the power to a specific type of power for the WCD.

In one implementation, the relay 200 may be a tile. The tile may receive solar energy from sunlight and then rebroadcast the power in RF. For example, one or more tiles may be included in a walkway of a building. The one or more tiles absorb solar energy and radiate magnetic fields or RF power. For example, each tile may include a solar cell structure (i.e., forward biased junction diodes) to provide the input power. In one implementation, the solar energy is converted by solar cells to direct current (DC) power which in turn may be coupled to an RF module. The RF module converts the DC power to RF power. The RF module may include an RF amplifier and an antenna. In one implementation, a table can be a transmitter that radiates a magnetic field. A mouse pad deposited on the table may act as a passive relay. The mouse pad collects/receives the magnetic field and converts the magnetic field to a different power form. The mouse pad may transmit the converted power to a computer mouse deposited on the mouse pad. As discussed previously herein, the power may be converted to RF, a different frequency of inductive energy, and the like.

In one implementation, the mouse pad acting as a passive relay includes a coil configuration or a magnetic structure to redirect and focus the magnetic field received from the table.

In one embodiment, the relay 200 transfers power to a second relay associated with a second user. For example, a first relay associated with a first user may receive solar energy and convert the solar energy to RF. The first relay may output the RF power to a second relay or an electronic device associated with a second user. The second relay may then select to store the power or to transmit the power to a third relay or another electronic device. Thus, the power may be transported through a chain. The feature described herein provides the advantage of allowing users to charge WCDs anywhere without any restriction from wired connection locations or availability of a power type from a source.

Figure 3A:
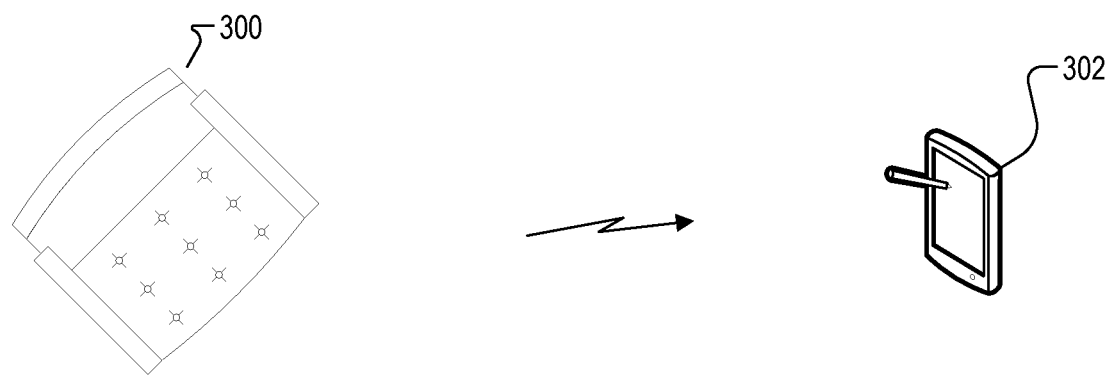
FIG. 3A is a schematic that illustrates exemplary wireless charging relays according to one example.
Figure 3B:
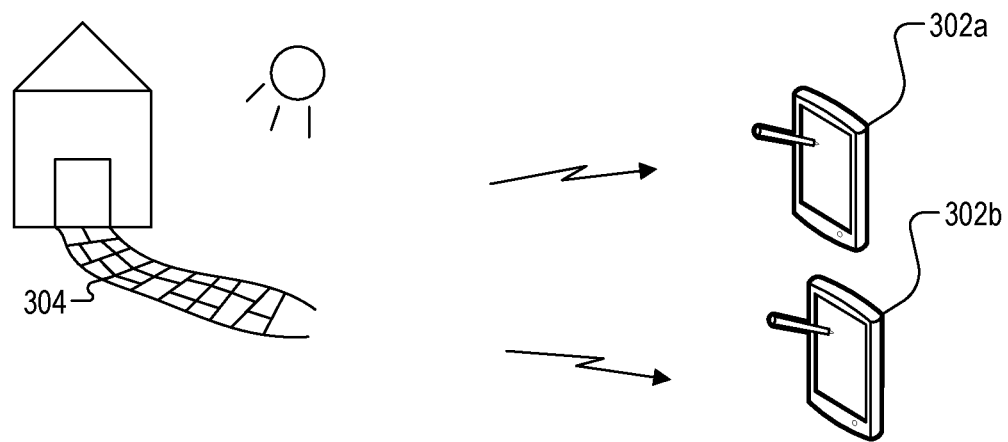
FIG. 3B is another schematic that illustrates exemplary wireless charging relays according to one example.

FIGS. 3A and 3B are schematic illustrations of exemplary wireless charging relays according to one example. FIG. 3A shows a passive relay 300 embedded in a chair. The relay 300 receives power from a plurality of sources in a plurality of forms. The relay 300 transmits the converted power to an electronic device 302. FIG. 3B shows a plurality of tiles 304. Each tile acts as a passive relay as described previously herein. The plurality of tiles receives solar energy and converts the solar energy to RF power. One or more WCDs receive power from the plurality of tiles 304. For example, electronic devices 302*a* and 302*b* may receive RF power from the plurality of tiles 304.

Figure 4:
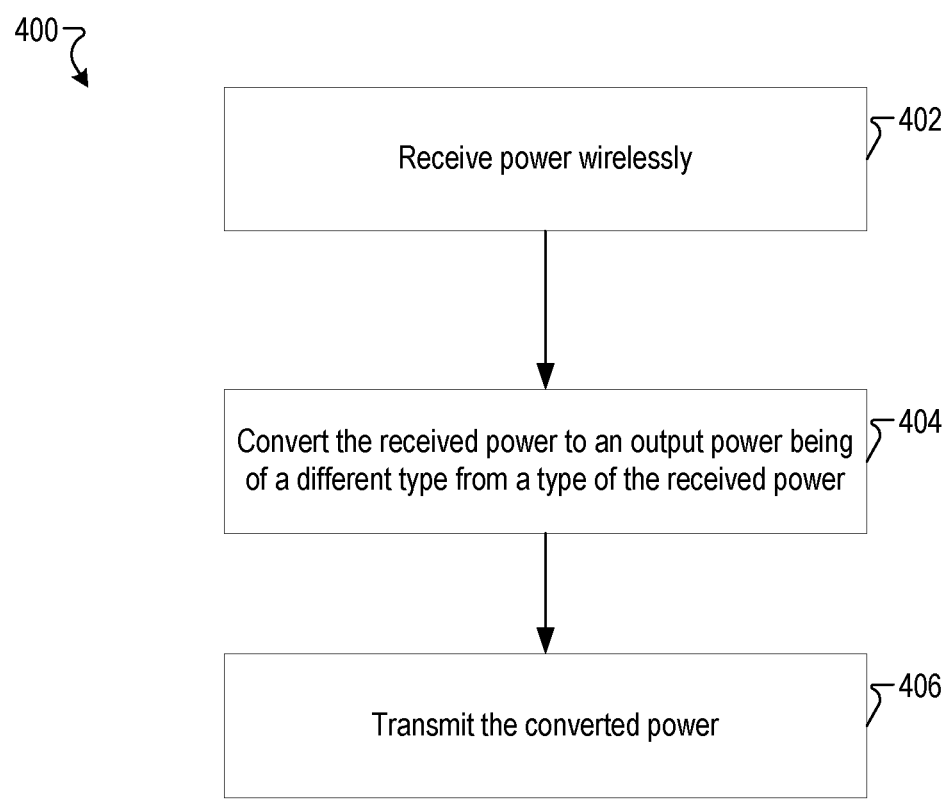
FIG. 4 is a flowchart for a wireless charging process according to one example.

FIG. 4 is a flowchart for a wireless charging process according to one example. Certain details and features have been left out of flowchart 400 that are apparent to a person of ordinary skill in the art. For example, a step may include one or more substeps or may involve specialized equipment or materials, as known in the art.

At step 402, the relay receives power wirelessly from one of at least two different input wireless power sources. The relay may select the type of power received based a plurality of factors. For example, a cost function may be associated with each type of power. The relay selects the one or more forms of power to receive by optimizing a load function based on a current power being transmitted to one or more electronic devices and/or one or more relays.

At step 404, the relay converts the received power to an output wireless power. The type of the output wireless power may be different from the type of the input power. The type of the output power may be determined based on an identifier of the WCD. For example, the WCD may be capable to receive predetermined forms of power. In one implementation, the WCD may select to receive a type of a power based on a plurality of factors including a fee, availability, incentive, and the like.

At step 406, the converted output power is transmitted. The transmission of the output wireless power is configured to wirelessly charge one or more electronic devices. In other implementations, the converted output power may be received by another wireless charging relay.

Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A wireless charging relay comprising:
   processing circuitry configured to
      receive a first type of power wirelessly from a first input wireless power source, the first type of power comprising one of laser, light, radio frequency, induction, inductive resonance, or audio;
      receive a second type of power wirelessly from a second input wireless power source different from the first input wireless power source, the second type of power comprising one of laser, light, radio frequency, induction, inductive resonance, or audio and the second type of power being different from the first type of power,
      convert the power received from the first and second input wireless power sources to an output wireless power, wherein a third type of power of the output wireless power is different from the first and second types of power and the third type of power comprises one of laser, light, radio frequency, induction, inductive resonance, or audio, and
      transmit the output wireless power wirelessly to another device.

2. The wireless charging relay of claim 1, further comprising:
   a battery configured to store the received power.

3. The wireless charging relay of claim 1, wherein the transmission of the output wireless power is configured to wirelessly charge one or more electronic devices.

4. The wireless charging relay of claim 1, further comprising:
   a universal serial bus (USB) interface configured to receive power and to output the received power.

5. The wireless charging relay of claim 1, wherein the output wireless power is received by another wireless charging relay.

6. The wireless charging relay of claim 1, further comprising:
   one or more solar cells configured to convert solar energy into a direct current; and
   a radio frequency (RF) power converter configured to convert the direct current into RF power.

7. The wireless charging relay of claim 1, further comprising:
   communication circuitry configured to receive a power type from one or more electronic devices.

8. The wireless charging relay of claim 1, wherein the processing circuitry is further configured to convert the power received from one of the first and second input wireless power sources having a first frequency to the output wireless power having a second frequency.

9. A system comprising:
a plurality of wireless charging relays, each wireless charging relay including processing circuitry configured to
receive a first type of power wirelessly from a first input wireless power source, the first type of power comprising one of laser, light, radio frequency, induction, inductive resonance, or audio,
receive a second type of power wirelessly from a second input wireless power source different from the first input wireless power source, the second type of power being different from the first type of power and the second type of power comprising one of laser, light, radio frequency, induction, inductive resonance, or audio,
convert the power received from the first and second input wireless power sources to an output wireless power, wherein a third type of power of the output wireless power is different from the first and second types of power received from the first and second input wireless power sources and the third type of power comprises one of laser, light, radio frequency, induction, inductive resonance, or audio, and
transmit the output wireless power wirelessly to another device.

10. The system of claim 9, wherein each wireless charging relay further includes:
a battery configured to store the received power.

11. The system of claim 9, wherein the transmission of the output wireless power is configured to wirelessly charge one or more electronic devices.

12. The system of claim 9, wherein each wireless charging relay further includes:
a universal serial bus (USB) interface configured to receive power and to output the received power.

13. The system of claim 9, wherein the output wireless power is received by another wireless charging relay.

14. The system of claim 9, wherein one or more of the plurality of wireless charging relays further include:
one or more solar cells configured to convert solar energy into a direct current; and
a radio frequency (RF) power converter configured to convert the direct current into RF power.

15. The system of claim 9, wherein each wireless charging relay further includes:
communication circuitry configured to receive a power type from one or more electronic devices.

16. A method comprising:
receiving a first type of power wirelessly from a first input wireless power source, the first type of power comprising one of laser, light, radio frequency, induction, inductive resonance, or audio,
receiving a second type of power wirelessly from a second input wireless power source different from the first input wireless power source, the second type of power being different from the first type of power and the second type of power comprising one of laser, light, radio frequency, induction, inductive resonance, or audio,
converting the power received from the first and second input wireless power sources to an output wireless power, wherein a third type of power of the output wireless power is different from the first and second types of power received from the first and second input wireless power sources and the third type of power comprises one of laser, light, radio frequency, induction, inductive resonance, or audio, and
transmitting the output wireless power wirelessly to another device.

17. The method of claim 16, wherein the transmission of the output wireless power is configured to wirelessly charge one or more electronic devices.

18. The method of claim 16, wherein the output wireless power is received by another wireless charging relay.

19. The method of claim 16, further comprising:
converting, via one or more solar cells, solar energy into a direct current; and
converting the direct current into RF power.

20. The method of claim 16, further comprising:
converting the power received from one of the first and second input wireless power sources having a first frequency to the output wireless power having a second frequency.

* * * * *